(12) United States Patent
Maryka et al.

(10) Patent No.: US 6,738,806 B1
(45) Date of Patent: May 18, 2004

(54) METHOD AND SYSTEM OF DEPLOYING AN APPLICATION BETWEEN COMPUTERS

(75) Inventors: Stephen Maryka, Calgary (CA); Bertrand Michaud, Calgary (CA); David Astels, Wolfville (CA)

(73) Assignee: Wind River International, Ltd., Toronto (CA)

( * ) Notice: Subject to any disclaimer, the term of this patent is extended or adjusted under 35 U.S.C. 154(b) by 0 days.

(21) Appl. No.: 09/332,191

(22) Filed: Jun. 14, 1999

(51) Int. Cl.[7] .................. G06F 15/16; G06F 15/177; G06F 9/44; G06F 9/445
(52) U.S. Cl. .................. 709/220; 709/202; 709/203; 709/208; 709/315; 709/327; 717/176; 717/177
(58) Field of Search ................ 709/220, 231, 709/201–203, 208, 225, 226, 310, 315, 321, 327; 717/174–178

(56) References Cited

U.S. PATENT DOCUMENTS

| | | | | |
|---|---|---|---|---|
| 5,857,201 A | * | 1/1999 | Wright et al. | 707/104.1 |
| 5,890,158 A | * | 3/1999 | House et al. | 707/10 |
| 6,067,416 A | * | 5/2000 | Fraser | 717/178 |
| 6,263,491 B1 | * | 7/2001 | Hunt | 717/130 |
| 6,263,498 B1 | * | 7/2001 | Alcorn et al. | 717/110 |
| 6,266,666 B1 | * | 7/2001 | Ireland et al. | 707/10 |
| 6,269,373 B1 | * | 7/2001 | Apte et al. | 707/10 |
| 6,321,263 B1 | * | 11/2001 | Luzzi et al. | 709/224 |
| 6,324,542 B1 | * | 11/2001 | Wright et al. | 707/104.1 |
| 6,341,289 B1 | * | 1/2002 | Burroughs et al. | 707/104.1 |
| 6,356,946 B1 | * | 3/2002 | Clegg et al. | 709/231 |
| 6,401,238 B1 | * | 6/2002 | Brown et al. | 709/224 |
| 6,407,751 B1 | * | 6/2002 | Minami et al. | 345/736 |
| 6,434,595 B1 | * | 8/2002 | Suzuki et al. | 709/202 |
| 6,442,754 B1 | * | 8/2002 | Curtis | 717/175 |
| 6,484,214 B1 | * | 11/2002 | Sundermier | 709/332 |
| 6,496,979 B1 | * | 12/2002 | Chen et al. | 717/178 |
| 6,519,625 B1 | * | 2/2003 | Murrell et al. | 709/202 |
| 6,567,846 B1 | * | 5/2003 | Garg et al. | 709/218 |
| 6,571,389 B1 | * | 5/2003 | Spyker et al. | 717/176 |

OTHER PUBLICATIONS

Sun Microsystems, Java Beans Version 1.01, Hamilton, G., 1996, Sun Microsystems, Mountainview, CA.*
Java Dynamic Management Kit 3.0 Programming Guide, 1998 Sun Microsystems Inc.*

* cited by examiner

*Primary Examiner*—Robert B. Harrell
*Assistant Examiner*—Melvin H Pollack
(74) *Attorney, Agent, or Firm*—Fay Kaplun & Marcin LLP

(57) ABSTRACT

A method of deploying an application for shared execution between at least one alternate computing resource and a device interconnected by a communication medium. The method including the categorizing of the application into device objects and server objects, where at least certain ones of the objects are selectively categorized as a function of a set of criteria. The method further includes the creating of a set of managed objects from said server objects, loading said server objects onto said at least one alternate computing resource, and loading said managed objects and said device objects onto said device.

14 Claims, 10 Drawing Sheets

METHOD AND SYSTEM OF DEPLOYING AN APPLICATION BETWEEN COMPUTERS

FIELD OF THE INVENTION

The present invention relates generally to allocation of computer resources and more specifically relates to a method and system for deploying an application between two or more computers in a fashion that is transparent to a user.

BACKGROUND OF THE INVENTION

The development of network computing ("NC") technology has spawned the development of several intelligent devices, ranging from simple thin-client desk-top computers, to internet-aware screen phones, mobile phones, personal digital assistants ("PDAs"), public kiosks, smart-card based banking devices, etc. The Java computer language has been an important feature of this technological development, as it provides a "Write Once, Run Anywhere" platform which is an effective way to pass an application from a server to a device for local execution on the device. Thus, Java provides the ability to transparently deliver, via a communications mechanism, such as a general purpose network or a special purpose communications port, software to a variety of devices having different hardware platforms and has become a standard language for internet applications.

While Java can be run on a variety of different intelligent devices, such intelligent devices still require a minimum set of hardware resources capable of executing necessary resident software applications that allow a user to interact with the device and the network. Thus, developers of intelligent devices are confronted with a tension between the desire to reduce required hardware resources and yet increase device software functionality. Furthermore, software developers wishing to offer an application for execution on a range of devices are confronted with devices having different available hardware resources, and thus an application designed for execution on a device with reduced hardware resources will underutilize available hardware on another device having improved hardware resources.

An additional difficulty is confronted by hardware developers and software developers working concurrently to develop an intelligent device with at least one software application. While a hardware developer can provide proposed specifications to a software developer for the final hardware device, it is possible that the finalized device has hardware functionality (such as central processing unit power or random access memory) which differs from that anticipated, and thus the device would be over or under utilized. The software developer can therefore be required to modify an otherwise completed software application to suit the final hardware design.

SUMMARY OF THE INVENTION

It is an object of the present invention to provide a novel method and system of deploying an application between computers which obviates or mitigates at least one of the disadvantages of the prior art.

In an embodiment of the invention, there is provide a method of deploying an application for shared execution between at least one alternate computing resource and a device, comprising the steps of:

categorizing the application into device objects and server objects;

creating a set of managed objects from the server objects;

loading the server objects onto the at least one alternate computing resource; and loading the managed objects and the device objects onto the device.

In a particular aspect of the embodiment, the alternate computing resource is a Java-based server, and the device is Java-based. Furthermore, the device objects and server objects are based on the JavaBeans specification, and the managed objects are created using the "mogen" tool from the Java Dynamic Management Kit.

In another embodiment of the invention, there is provided a system for deploying a device application, the application being categorized into server objects and device objects, where the system comprises a device operable for communication with a computer network and operable for executing the device objects and a set of managed objects, the managed objects being proxies for the server objects. The system also comprises at least one alternate computing resource operable for communication over the network and operable for executing the server objects, the server objects for receiving function calls passed from the managed objects over the network and returning values for the function calls back to the managed objects.

In a particular aspect of the embodiment, the alternate computing resource is a Java-based server, and the device is a Java-based intelligent device.

In yet another embodiment of the invention, there is provided a software application categorizable (i.e. capable of being categorized) into at least one server object and at least one device object, each of the at least one server objects being created by an operation into corresponding managed objects, the at least one server object for execution on an alternate computing resource and for receiving function calls passed from the managed objects and returning values for the function calls back to the managed objects, the at least one device object and the at least one managed object being executable as the application on a device in a transparent fashion to a user.

In another embodiment, there is provided a software application for execution on a device connectable to an alternate computing resource over an network, the application comprising: at least one device object; and, at least one managed object for interaction with the at least one device object, the at least one managed objects each having a corresponding server object executing on the alternate computing resource, the server objects for receiving method calls or function calls passed from the managed objects and returning values for the method calls or function calls back to the managed objects.

BRIEF DESCRIPTION OF THE DRAWINGS

The present invention will now be explained, by way of example only, with reference to certain embodiments and the attached Figures in which.

DETAILED DESCRIPTION OF THE INVENTION

Figure 1:
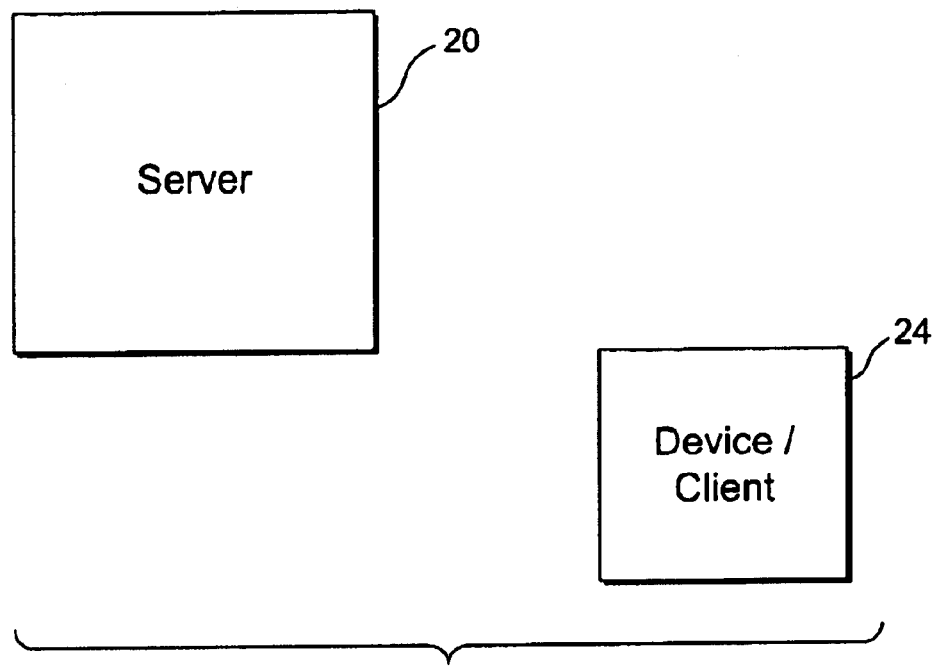
FIG. 1 is a schematic diagram of two computers, a server and a device, suitable for use implementing the present invention.

FIG. 1 shows two computers, a server 20 and a device 24, which are suitable for use in an embodiment of the present invention. Server 20 is any server known in the art, such as the Sun Enterprise 450 server sold by Sun Microsystems of Palo Alto Calif., and generally includes a central processing unit, random access memory, a data storage means, and a computer network interface to allow server 20 to communicate over a communication medium such as the internet. In an embodiment of the invention, server 20 is generally operable to function as a Java-based network computing server. Device 24 is any intelligent device known in the art, (such as internet-aware screen phones, mobile phones, personal digital assistants ("PDAs"), public kiosks, smart-card based banking devices, etc.), and has a basic set of hardware resources, such as a central processing unit, random access memory, input/output device(s), so that it is generally operable to act as a client to server 20.

Figure 2:
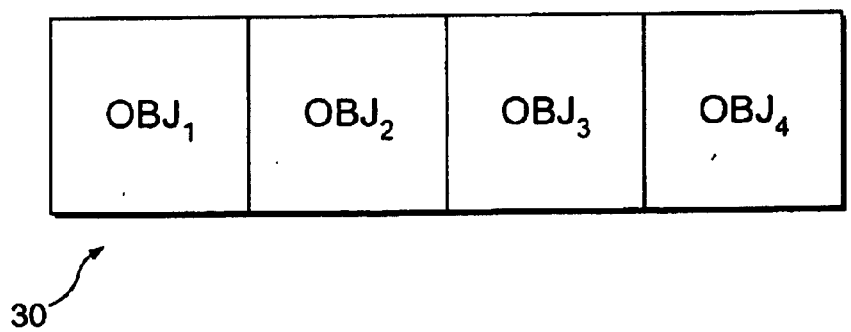
FIG. 2 is a schematic diagram of a software application intended to reside on the device of FIG. 1.

FIG. 2 shows an application 30 intended for execution on device 24. For example, device 24 can be a personal digital assistant ("PDA"), and application 30 can be a telephone directory software application having a graphical user interface ("GUT"). Application 30 is preferably written in an object-oriented language and structure known in the art, and contains four objects, $OBJ_1$, $OBJ_2$, $OBJ_3$, $OBJ_4$ each of which interact with each other according to their function within the overall function of application 30. (It will be appreciated that the four objects $OBJ_1$, $OBJ_2$, $OBJ_3$, $OBJ_4$ in the present embodiment are for purposes of simplifying the explanation of the embodiment only and that application 30 can have a different number of objects.)

In an embodiment of the present invention, objects $OBJ_1$, $OBJ_2$, $OBJ_3$, $OBJ_4$ are managed-beans or m-beans, a type of JavaBeanm™, the specifications for which are outlined in *Sun Microsystems, JavaBeans*™, Version 1.01, Hamilton, G. (Editor), 1996, Sun Microsystems Inc., Mountain View Calif. and *Java Dynamic Management Kit* 3.0 *Programming Guide*, Chapter 3, 1998 Sun Microsystems, Inc. 901 San Antonio Road, Palo Alto, Calif. 94303 U.S.A.

Figure 3:
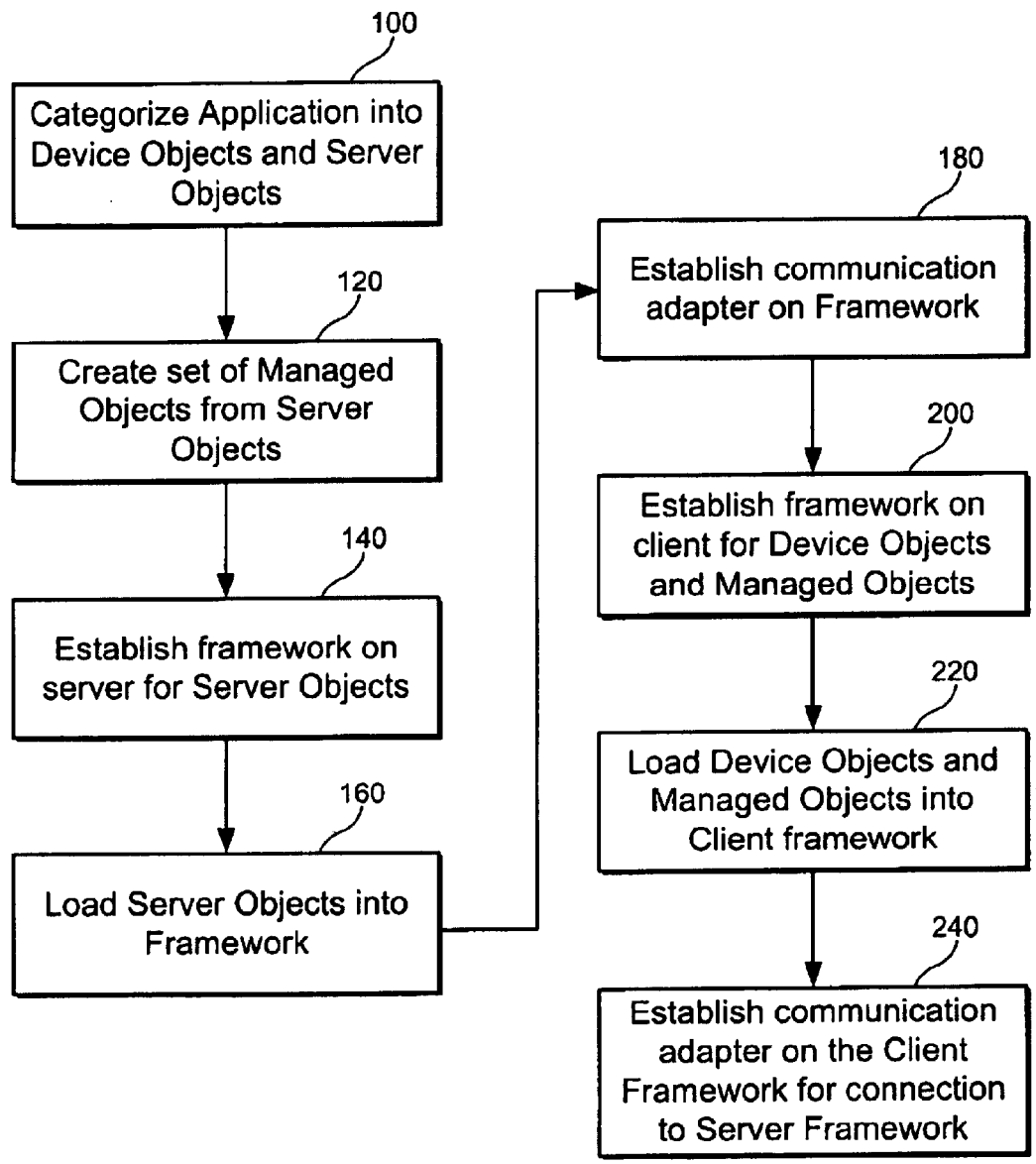
FIG. 3 is flow-chart of a method of deploying the software application of FIG. 2 between the server and device of FIG. 1, in accordance with an embodiment of the present invention.
Figure 4:
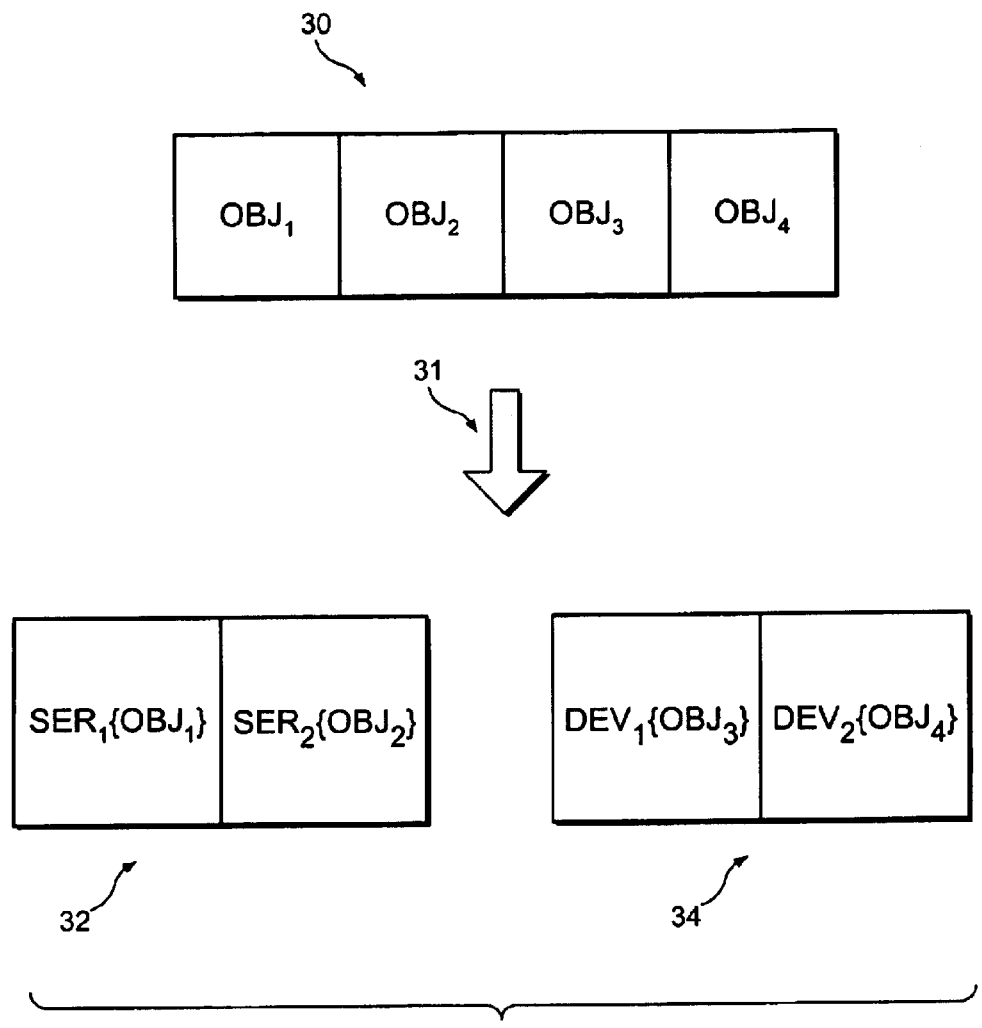
FIG. 4 is a schematic diagram showing an operation which determines objects within the application should be deployed to the server.

Referring now to FIG. 3, a method for deploying application 30 between server 20 and device 24 will now be explained. At step 100, the objects making up application 30 are categorized into device objects and server objects. Categorizing operation 31 is performed, as shown in FIG. 4, on objects of application 30 to determine if the object must be executed on a device, or if the object can be executed on the server. This determination can be accomplished by examining the function and purpose of each object $OBJ_1$, $OBJ_2$, $OBJ_3$, $OBJ_4$, or by invoking an appropriate method in each object to have the object report its categorization. In the event that a definitive categorization cannot be made by examining the object, for example for a legacy program, or by other suitable means, the object will be categorized in a default category, which in most cases will be that it must execute on a device.

Where categorizing operation 31 determines that one or more objects are suitable for execution on server 20, then operation 31 can further consider exactly which objects (i.e. $OBJ_1$, $OBJ_2$, $OBJ_3$, and/or $OBJ_4$) of application 30 should be executed on which of server 20 and a particular device 24. For example, application 30 will generally comprise at least one object which is used to implement a graphical user interface ("GUI") on device 24. Since a GUI object is critical for the functioning of application 30 on device 24, categorization operation 31 will determine that GUI objects are categorized as device objects which must be executed on device 24. It will be apparent that other objects composing application 30 can also be critical to device 24, and must be categorized for execution on a device 24, such as objects relating to input and output operations on the device.

On the other hand, where an object is generally related to network connectivity functions for application 30, then such objects can be categorized for execution on either server 20 or an appropriate device 24. It will be further apparent that other objects composing application 30 can be categorized for execution on server 20, such as objects relating to the searching or manipulation of user-data resident on server 20, or arithmetic operations. A variety of other criteria can be used to deploy application 30, as will occur to those of skill in the art, but it can be generally seen that operation 31 will generally favor leaving certain objects of application 30 on device 24 if such objects are unsuitable for execution on server 20.

In the example shown in FIG. 4, categorizing operation 31 determines that objects $OBJ_1$ and $OBJ_2$ are appropriate for execution on either server 20 or a device 24, and creates $SER_1\{OBJ_1\}$ and $SER_2\{OBJ_2\}$ which are server objects 32, where server object $SER_1\{OBJ_1\}$ is identical to object $OBJ_1$ and a server object $SER_2\{OBJ_2\}$ is identical to $OBJ_2$. Similarly, categorizing operation 31 also determines that objects $OBJ_3$ and $OBJ_4$, must be executed on a device 24 and accordingly creates $DEVI\{OBJ_3\}$ and $DEV_2\{OBJ_4\}$ which are corresponding device objects 34, where $DEV_1\{OBJ_3\}$ is identical to object $OBJ_3$ and $DEV_2\{OBJ_4\}$ is identical to $OBJ_4$.

Figure 5:
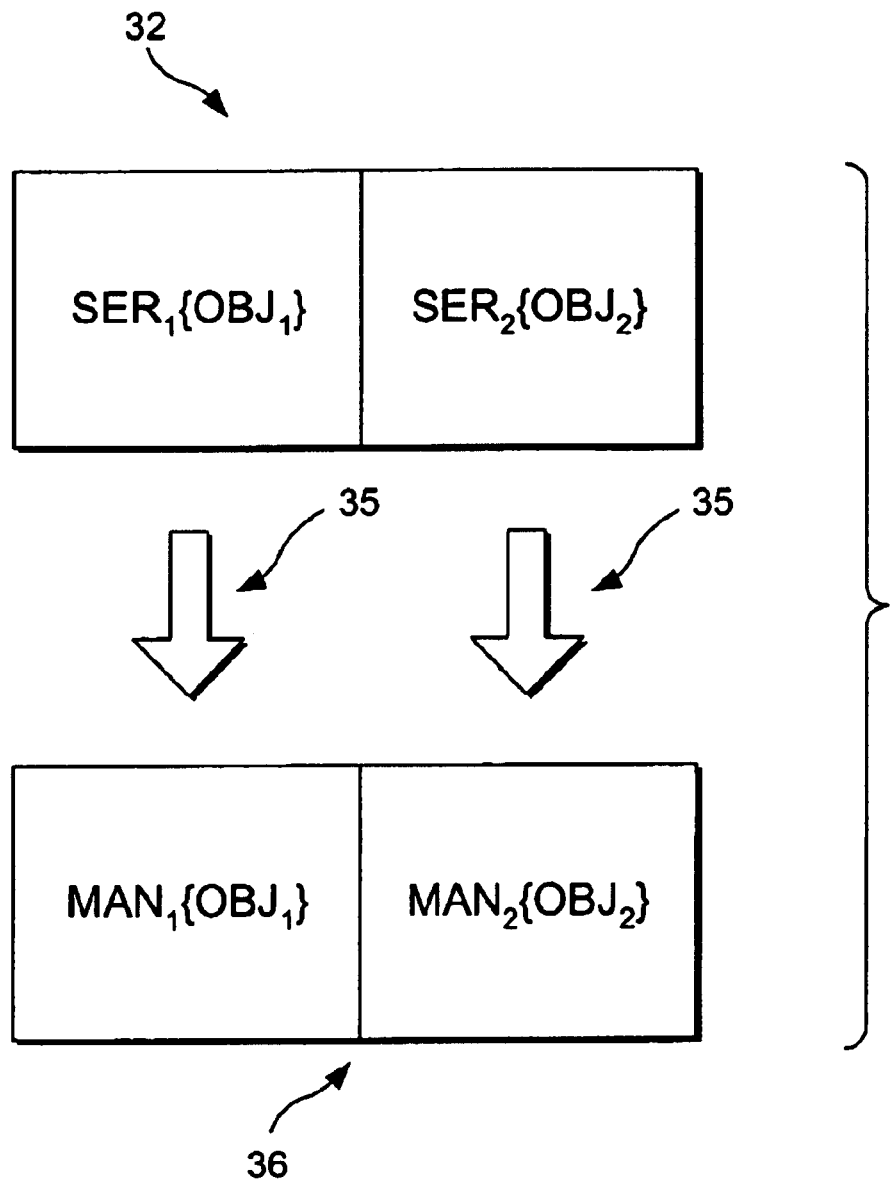
FIG. 5 is a schematic diagram showing a operation to create managed objects from server objects.

At step 120 of FIG. 3, a set of managed objects is created from server objects 32. In step 120, a managed object generation operation 35 is performed on server objects 32 to create managed objects 36, as indicated in FIG. 5. As will be apparent to those of skill in the art, managed objects 36 are smaller than server objects 32 but are proxy-like representations of server objects 32. Each managed object 36 has an identical application program interface ("API") to its corresponding server object 32 but does not include the implementation of its corresponding server object 32.

In an embodiment of the present invention, the managed object generation operation 35 is achieved with the "mogen" tool provided with the *Java Dynamic Management Kit*, and is discussed in "Generating a C-bean" in Chapter 2 of *Sun Microsystems, Java Dynamic Management Kit*, discussed earlier. It is to be understood, however, that other managed object generation operations 35 and implementations can be used, as will occur to those of skill in the art. Accordingly, using operation 35, managed object $MAN_1\{OBJ_1\}$ is created from server object $SER_1\{OBJ_2\}$ and managed object $MAN_2\{OBJ_2\}$ is created from server object $SER_2\{OBJ_2\}$.

Figure 6:
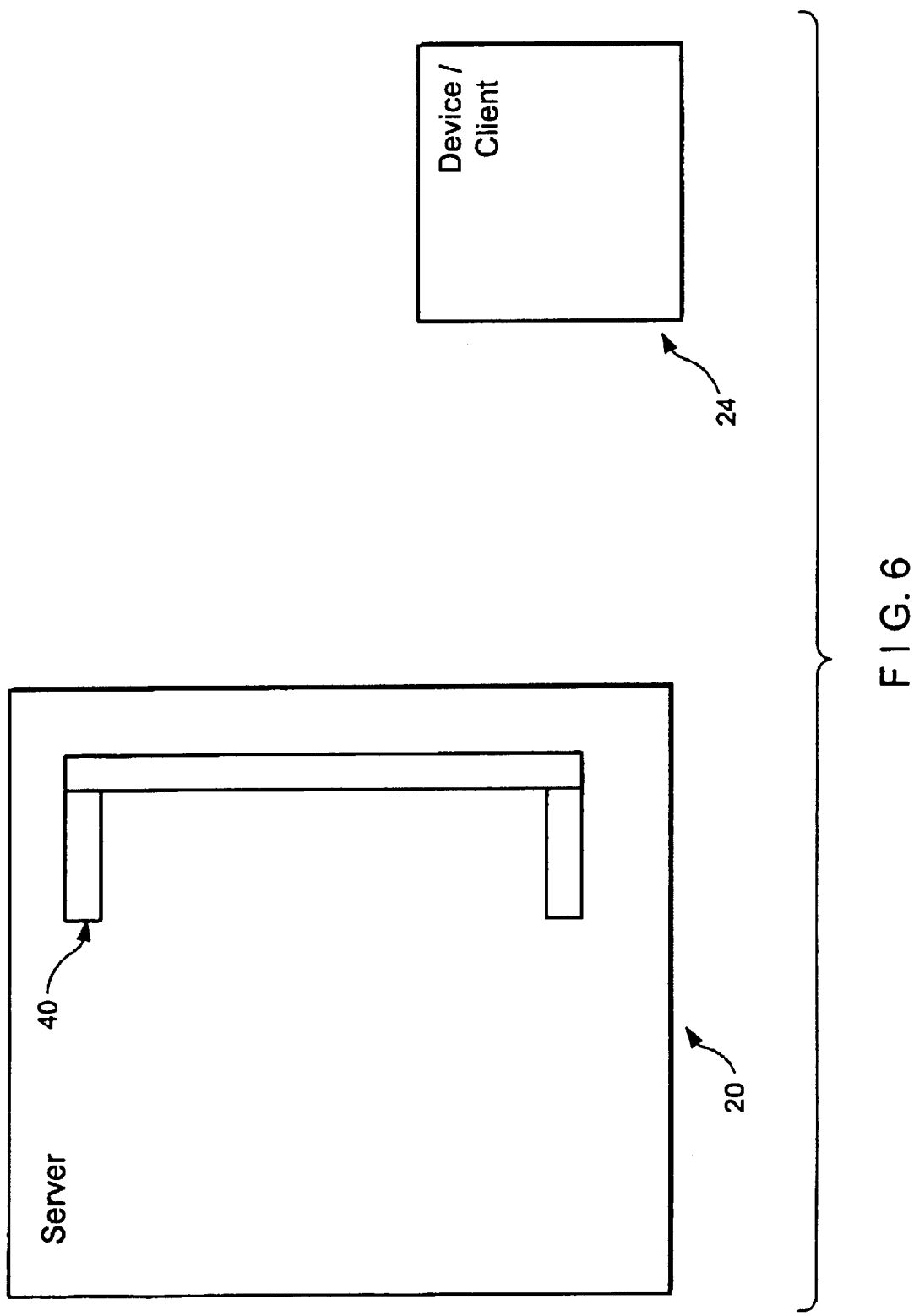
FIG. 6 is a schematic diagram showing the server and device of FIG. 1, having a framework established on the server.

At step 140, a framework 40, which is a registry means for server objects 32, is established on server 20 for server objects 32, as shown in FIG. 6. A suitable model for establishing such framework 40, for the JavaBean/m-bean type objects employed in an embodiment of the present invention, can be found in Chapter 10 of the *Sun Microsystems, Java Dynamic Management Kit*, however, it will occur to those of skill in the art that other frameworks 40 can be established depending on the type of objects implemented. Up to step 140, a particular device 24 need not be considered by the method of the present invention. From step 160 onwards however, the method proceeds in view of a particular device 24, or category of device.

Figure 7:
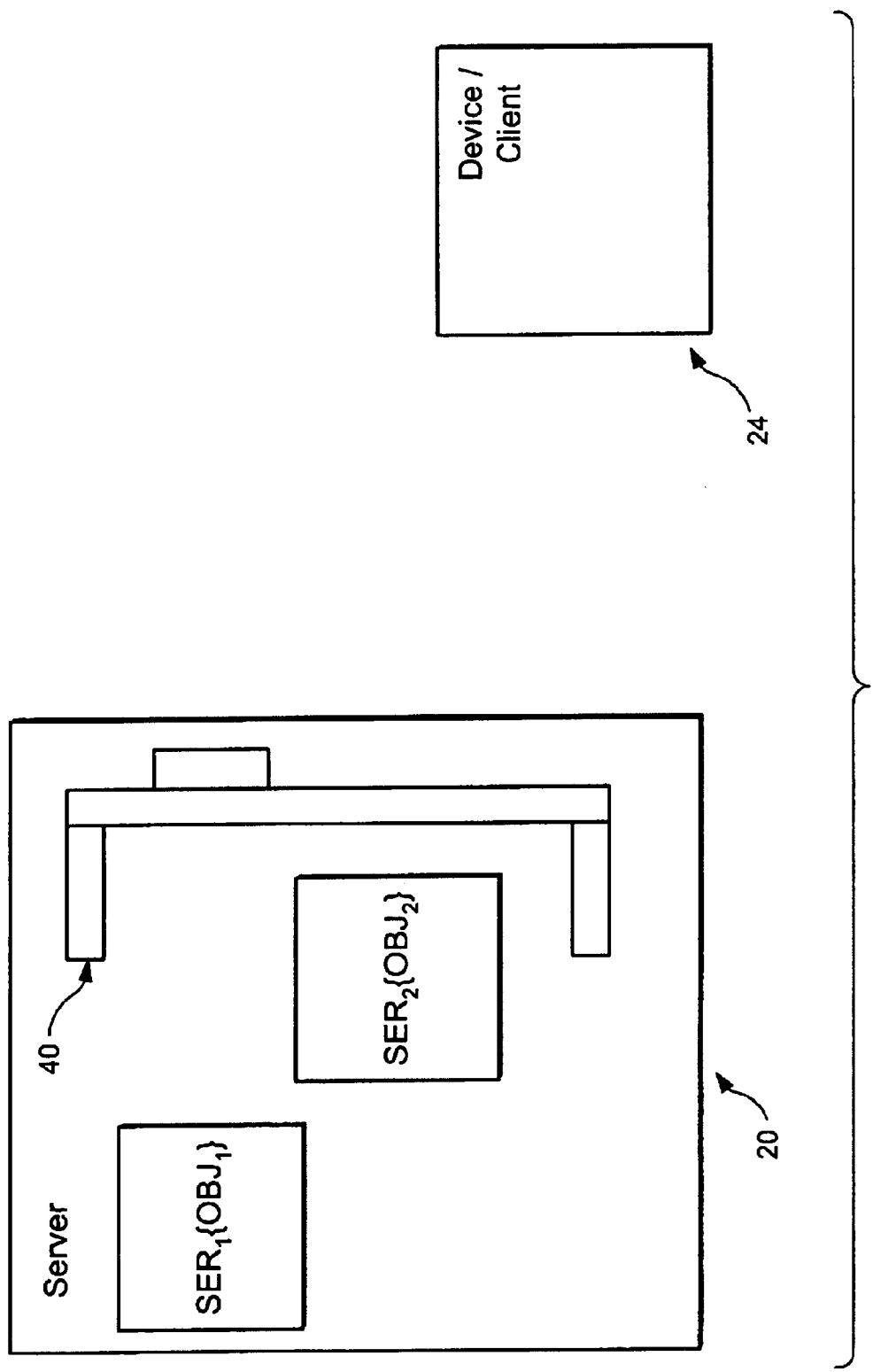
FIG. 7 is a schematic diagram showing the server objects loaded onto the server of FIG. 6.
Figure 8:
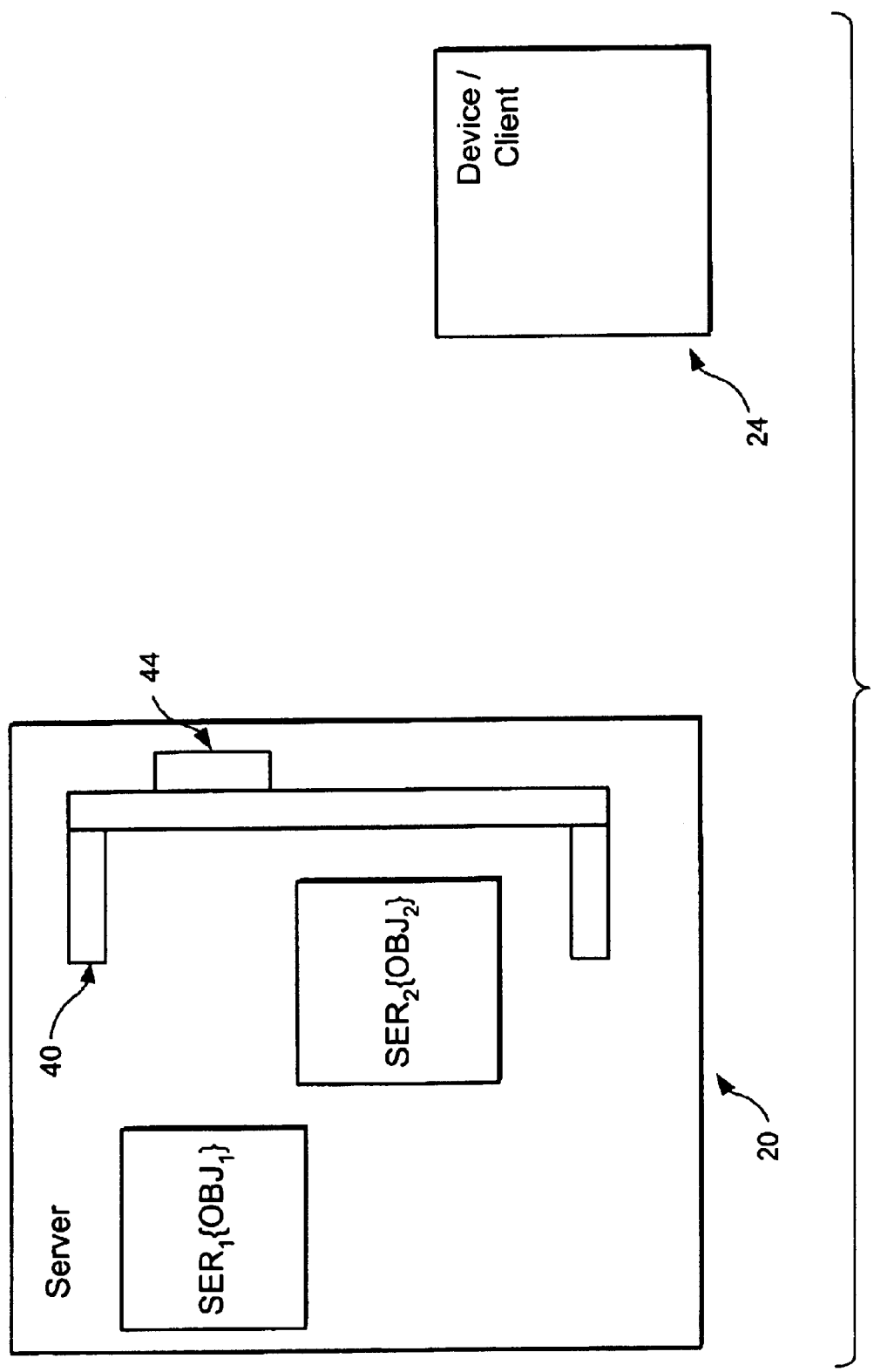
FIG. 8 is a schematic diagram showing a first communication adapter incorporated into the server of FIG. 6.

At step 160, server objects 32 are loaded into server framework 40 as shown in FIG. 7. At step 180, a server communication adapter 44 is established on framework 40 for connecting framework 40 to a communication medium, as shown in FIG. 8.

Figure 9:
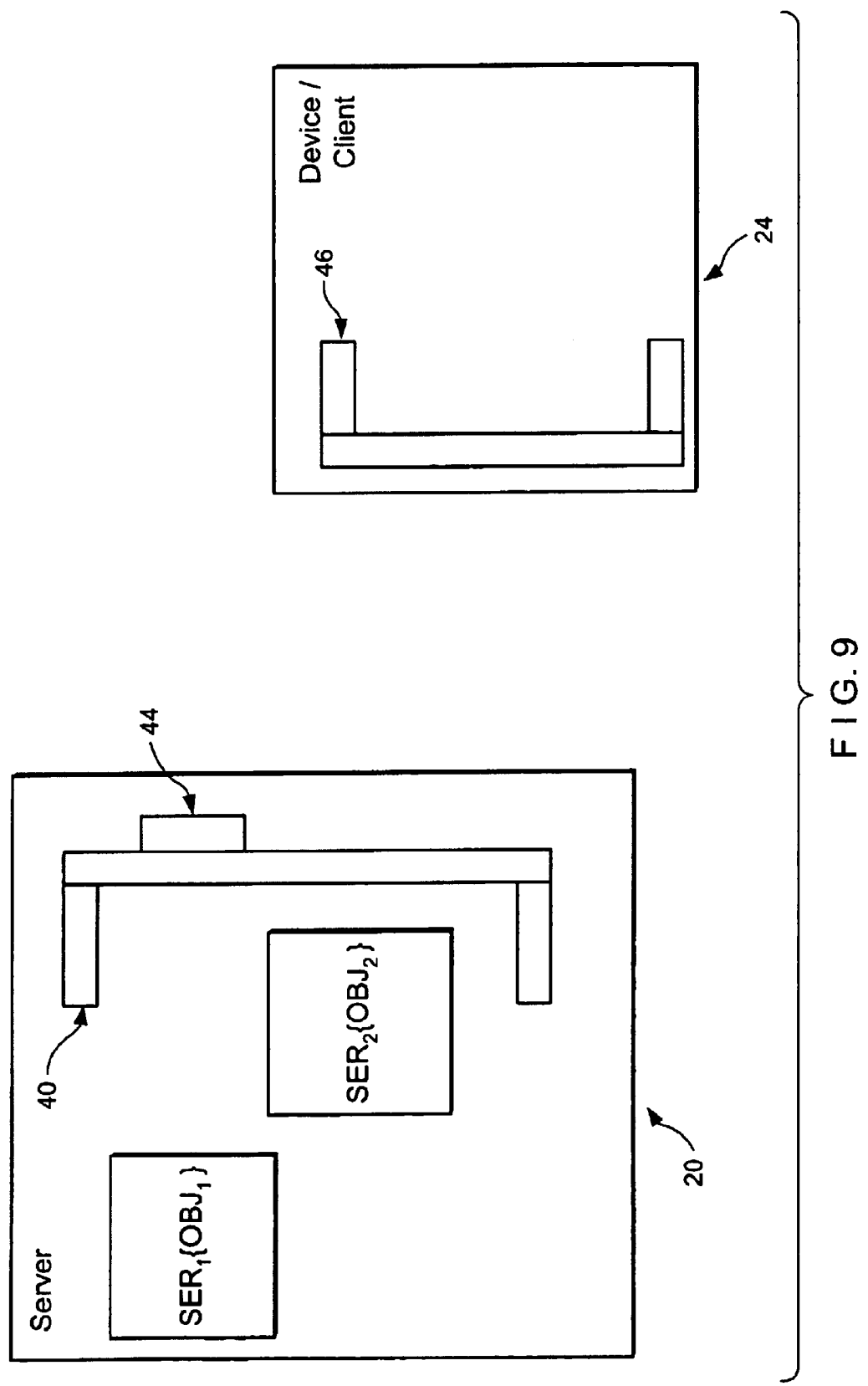
FIG. 9 is a schematic diagram showing a framework established on the device of FIG. 6.

At step 200, a device framework 46, which is a registry means for device objects 34 and managed objects 36, is established on a device 24 as shown in FIG. 9. Device framework 46 can be established in a similar fashion to server framework 40, or by any other suitable means.

Figure 10:
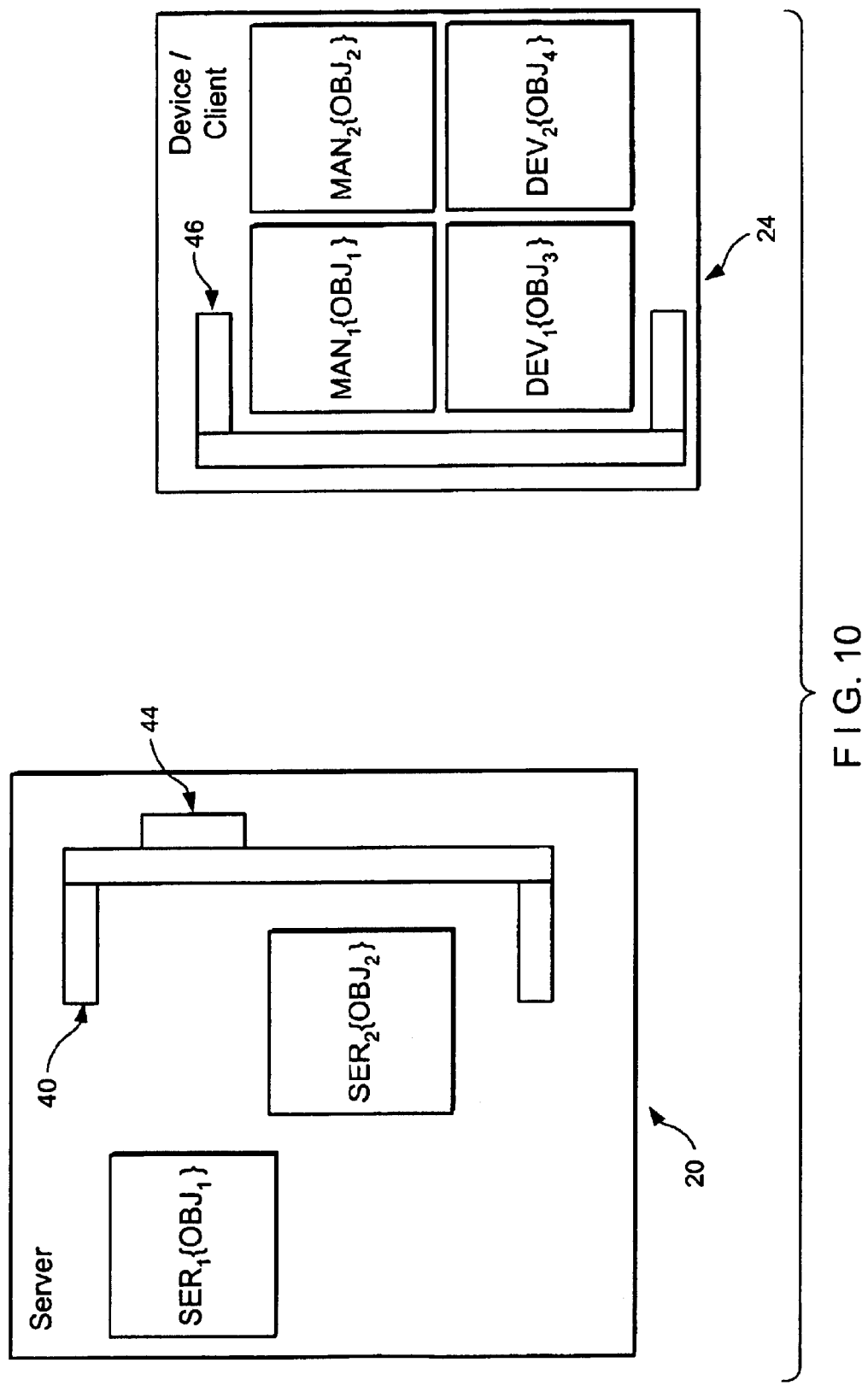
FIG. 10 is a schematic diagram showing the managed objects and device objects loaded onto the device of FIG. 6.

At step 220, device objects 34 (i.e. $DEV_1\{OBJ_3\}$ and $DEV_2\{OBJ_4\}$ and managed objects 36 (i.e. managed objects $MAN_1\{OBJ_1\}$ and $MAN_2\{OBJ_2\}$ are loaded into device 24 and registered with device framework 46, as shown in FIG. 10.

Figure 11:
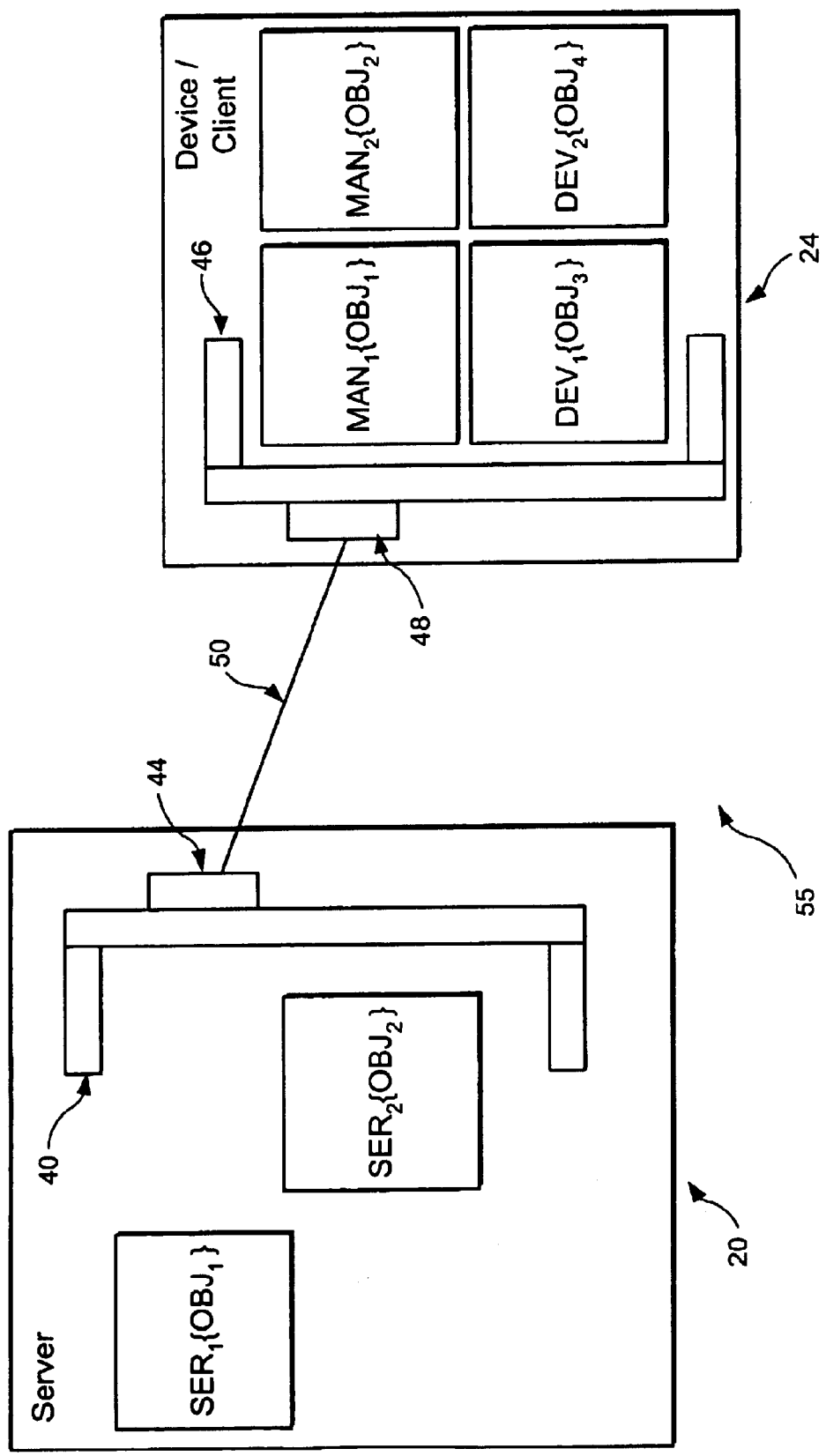
FIG. 11 is a schematic diagram showing a second communication adapter incorporated into the device of FIG. 6.

At step 240, a device communication adapter 48 is established on framework 46 to connect framework 46 to framework 44 via a communication medium 50 to complete system 55, as shown in FIG. 11.

A suitable model for establishing server communication adapter 44 and device communication adapter 48 is found in Chapter 5 *Sun Microsystems, Java Dynamic Mangement Kit*. Collectively, server communication adapter 44 and device communication adapter 48 comprise a single adapter in accordance with Chapter 5 *Sun Microsystems, Java Dynamic Management Kit*. However, as will occur to those of skill in the art, other adapters 44, 48 and/or frameworks 40, 46 can be employed, depending on the type of objects implemented.

During operation of system 55, a user interacts in the usual manner with application 30 executing on device 24. When objects. $OBJ_1$ and $OBJ_2$ are called by application 30, managed objects $MAN_1\{OBJ_1\}$ and $MAN_2\{OBJ_2\}$ are actually accessed on device 24, which, through communication adapters 48 and 44, interact with server objects $SER_1\{OBJ_1\}$ and $SER_2\{OBJ_2\}$ respectively. These server objects perform their defined functions and return the appropriate values and/or data back to the corresponding managed objects $MAN_1\{OBJ_1\}$ and $MAN_2\{OBJ_2\}$. Device objects $DEV_1\{OBJ_3\}$ and $DEV_2\{OBJ_4\}$ execute on device 24 in the usual manner. Accordingly, a user can transparently interact with application 30 on device 24, unaware that a portion of application 30 is actually executing on server 20.

In the example above, all of server objects 32 are loaded onto the server. However, it is also contemplated that, if the particular device 24 or category of device, under consideration has ample resources, one or more server objects 32 may not be loaded on to the server and instead, the corresponding objects (eg.—$OBJ_1$, $OBJ_2$) can be loaded in to the device 24. This can provide advantages, for example where limited bandwidth is available between server 20 and device 24. The particular server objects 32 that are not loaded onto the server can be selected in view of the resources available in the particular device 24.

In another embodiment of the invention, application 30 can be written so that some of its objects are specifically intended for execution on server 20, some of its objects are specifically intended for execution on device 24, and the remaining objects can be executed on either server 20 or device 24. In this embodiment, at step 100, categorizing operation 31 categorizes the objects specifically intended for server 20 into server objects 32, and categorizes the objects specifically intended for device 24 into device objects 34. Once a specific device 24, or category of device, is known to the method a set of criteria, (based on, for example, available hardware resources such as available random access memory on the specific device 24) is employed to categorize the remaining objects as being server objects 32 or device objects 34 for that specific device 24 or category of device. At step 120, a set of managed objects 36 is created from the objects which were categorized to server objects 32. Steps 140–240 are then performed as before.

While the embodiments discussed herein are directed to particular implementations of the present invention, it will be apparent that the sub-sets and variations to these embodiments are within the scope of the invention. For example, while the embodiments herein are directed to JavaBean objects, it will be apparent that other types of objects or component architectures can be implemented in accordance with the teachings of the invention. Furthermore, it is contemplated that server objects can actually be stored and executed on multiple servers. It can be also seen that server objects need not be executed on a conventional server, and can in fact be executed on any alternate computing resource as will occur to those of skill in the art. In addition, while the registry of the embodiments discussed herein are implemented in the form of a framework, it will be apparent that in other embodiments the registry means can be incorporated directly into each of the objects of the application, thus eliminating the need for a separate framework.

It will also be apparent that the various steps of the methods disclosed herein need not be performed in the exact order as shown. For example, a complete set of managed objects could be generated, prior to the categorizing of the application into device objects and server objects. This set of managed objects could be stored on the server, and only the necessary managed objects would be loaded onto the device at the time of deployment.

The present invention provides a novel method and system of deploying an application between at least one server and a device. An operation determines whether certain objects are to be categorized into device objects or server objects. Managed objects can be established from the server objects which are generally smaller than the server object. These managed objects and the device objects can be stored and executed on the device so that the overall application requires fewer hardware resources on the device. During execution, calls to the managed objects result in a transparent access to their associated server objects. Efficient use of hardware resources on the device is thus provided in a manner that is transparent to the user.

The present invention can also be used during real-time deployment of an application from a server onto a device, where prior to downloading the application the server can determine the available resources on the device and use this information during the categorizing of objects between the device and the server. It will be apparent that in the present example, the downloading of smaller managed objects to the device, instead of the entire larger object, will also improve download time to the device.

An application developer using the present invention has improved flexibility, as an application can be written for a device framework which is extended or extendible to a server, providing an 'extended framework'. Thus, the developer can write applications for a range of devices having different hardware platforms and varying hardware resources, simply by partitioning the application during its creation so that it can be conveniently categorized into server objects and device objects. Additionally, a hardware developer and an application developer can work concurrently to develop an intelligent device and accompanying application software. The hardware developer can provide flexible device configuration parameters to the application developer, such that portions of the application can be loaded onto an alternative computing device for execution should the final hardware capacity of the device prove too restrictive to handle the entire application.

We claim:

1. A method of deploying an application for shared execution between at least one alternate computing resource and a device interconnected by a communication medium, comprising the steps of:

categorizing said application into device objects and server objects, at least certain ones of the objects being selectively categorized as a function of a set of criteria;

creating a set of managed objects from said server objects;

loading said server objects into a server framework on said at least one alternate computing resource; and loading said managed objects and said device objects into a device framework on said device.

2. The method according to claim 1 comprising an additional step of partitioning said application into objects capable of categorization into device objects and server objects.

3. The method according to claim 1 wherein said step of creating is the mogen operation from the Java Dynamic Management Kit.

4. The method according to claim 1 wherein said device objects and said server objects are m-beans based on the JavaBeans and Java Dynamic Management Kit specifications.

5. The method according to claim 1 wherein said categorizing is determined based on an operation that considers at least in part an inventory of available hardware resources on said device.

6. The method according to claim 1 wherein said at least one alternating computing resource is a server having a file storage means and said application is stored on said file storage means.

7. A method of deploying a device application for shared execution between at least one alternate computing resource and said device, comprising the steps of:

categorizing said application into device objects and server objects, at least certain ones of the objects being selectively categorized as a function of a set of criteria;

creating a set of managed objects from said server objects;

establishing a server framework on said at least one alternate computing resource;

loading said server objects into said server framework;

establishing a first communication adapter on said server framework;

establishing a device framework on said device;

loading said managed objects and said device objects into said device framework; and establishing a second communication adapter on said device framework for communication with said first communication adapter.

8. The method according to claim 7 wherein said step of creating is the mogen operation from the Java Dynamic Management Kit.

9. The method according to claim 7 wherein said device objects and said server objects are m-beans based on the JavaBeans and Java Dynamic Management Kit specification.

10. The method according to claim 9 wherein said framework is based on the Java Dynamic Management Kit.

11. The method according to claim 7 wherein said first communication adapter and said second communication adapter compose and adapter created in accordance with the Java Dynamic Management Kit.

12. The method according to claim 7 wherein said categorizing is determined based on an operation that considers at least in part an inventory of available hardware resources on said device.

13. A method of deploying an application for shared execution between at least one alternate computing resource and one of a plurality of devices interconnectable with said at least one alternate computing resource, said method comprising the steps of:

categorizing said application into device objects and server objects, at least certain ones of the objects being selectively categorized as a function of a set of criteria;

creating a set of managed objects from said server objects;

loading said server objects into a server framework on said at least one alternate computing resource;

establishing a first communication adapter on said at least one alternate computing resource;

loading said managed objects and said device objects into a device framework on said device; and establishing a second communication adapter on said device for communication with said first communication adapter.

14. A method of deploying an application according to claim 13, wherein the set of criteria comprises an indication of available hardware resources.

* * * * *